United States Patent [19]

Sebag et al.

[11] Patent Number: 5,633,017

[45] Date of Patent: May 27, 1997

[54] DEVICE FOR MANUFACTURING CUSHION OR MATTRESS ELEMENTS IN SUPPLE CELLULAR MATERIAL

[75] Inventors: Albert Sebag; Paul Benguigui, both of Nimes, France

[73] Assignee: Askle, Nimes, France

[21] Appl. No.: 379,178

[22] Filed: Jan. 27, 1995

[30] Foreign Application Priority Data

Feb. 4, 1994 [FR] France .................................. 94 01538

[51] Int. Cl.$^6$ ........................................................ B28B 1/50
[52] U.S. Cl. ........................... 425/4 R; 425/150; 425/259; 425/453; 249/160
[58] Field of Search ........................... 425/4 R, 4 C, 425/150, 453, 259; 249/160

[56] References Cited

U.S. PATENT DOCUMENTS

| 3,247,295 | 4/1966 | Burwell. | |
|---|---|---|---|
| 3,642,400 | 2/1972 | Theodorsen | 425/330 |
| 4,215,730 | 8/1980 | Oswald. | |
| 4,532,093 | 7/1985 | O'Malley | 425/145 |
| 4,720,253 | 1/1988 | Koentges | 425/150 |
| 5,244,610 | 9/1993 | Kitzmiller | 425/150 |
| 5,348,458 | 9/1994 | Pontiff | 425/4 C |
| 5,460,497 | 10/1995 | Vismara | 425/4 R |

FOREIGN PATENT DOCUMENTS

| 0114762 | 8/1984 | European Pat. Off.. |
|---|---|---|
| 0386818 | 9/1990 | European Pat. Off.. |

*Primary Examiner*—Allan R. Kuhns
*Attorney, Agent, or Firm*—Ladas & Parry

[57] ABSTRACT

This invention relates to a process for manufacturing cushion and mattress elements made of supple, open-cell cellular matter, by casting into a mould, from a head ensuring mixture of at least two basic components, of the product thus formed; said mould is transferred from a preparation station where a demoulding agent is projected, to be presented beneath said head; the latter is displaced along a continuous path covering at least all the surface of the mould and at a speed ensuring, on the one hand, a uniform distribution of the product and, on the other hand, a total time of passage less than the maximum expansion time of the product projected at the beginning of this path; a cover is closed on said mould, and the latter is transferred towards standby stations where it remains thus for a time longer than that of maturing of the cellular matter obtained; the cushion element thus constituted is removed and the mould is transferred back towards the preparation station.

5 Claims, 2 Drawing Sheets

DEVICE FOR MANUFACTURING CUSHION OR MATTRESS ELEMENTS IN SUPPLE CELLULAR MATERIAL

FIELD OF THE INVENTION

The present invention relates to processes and devices for manufacturing elements of cushions or mattresses of supple cellular material.

The technical sector of the invention is that of manufacturing cushions and mattresses to receive persons sitting or lying down.

One of the principal applications of the invention is the manufacture of such cushions or mattresses for medical use, to prevent bedsores.

BACKGROUND OF THE INVENTION

Such cushions or mattresses are in fact known, of which certain, and the present invention concerns this category, are made of supple cellular material, namely essentially open-cell foam of polyurethane type, and having a particular form, which makes it possible, on the one hand, to distribute the bearing pressure of the body that they receive, uniformly, in order to avoid points of contact more stressed than others, and on which bedsores might develop, and, on the other hand, to allow slight displacements by lateral deformation, without generating friction.

To that end, such a form which has been commonly used for a long time is of waffle-iron type, comprising a continuous sole, from which projections in the form of frustums of pyramid are distributed uniformly over the whole bearing surface desired.

Different standards exist in certain countries, to define the mininum characteristics of such cushions or mattresses, such as the French standard drawn up by the General Direction of Health, with, in particular, a minimum thickness of 17 cm, of which at least 8 for the sole, a foam density included between 24 and 45 kg/m$^3$, a remanent deformation less than 10% in accordance with standard ISO 1856, technical qualities of elasticity, of crush resistance and of long-life at least identical to those obtained with high-resilience foams, a fire-resistance in accordance with standard NF P926501, a tear strength greater than 170 N/m in accordance with standard NF T56109.

To satisfy these standards which, moreover, evolve and become increasingly severe, or to propose cushions possibly non-standard but with additional characteristics, various manufacturers have developed:

either various components to obtain a foam corresponding to the above characteristics, or various types of waterproof protections, essentially by removable cover or projection of paint added after the foam has been manufactured;

various processes for employing the foam to obtain the waffle-iron effect by cutting out a block or by pre-moulding same;

or combinations of said foam with other materials and/or other complementary devices.

Certain of these developments have formed the subject matter of a Patent Application, each for a specific characteristic. Mention may be made for example of French Patent Appln. FR 2 646 772 to Messrs. DUTSCHER and WACKERMAN, published on Nov. 16, 1990 for an "Improved anti-bedsore mattress with longitudinal protection and retaining edges", Appln. FR 2 630 644 to LABORATOIRES ESCARIUS published on Nov. 3, 1989 for an "Anti-bedsore cushion and mattress for medical use", Appln. FR 2 510 377 to the Swedish firm TIMMELE LAMINERING AB published on Feb. 4, 1983 for an "Elastic body covered with a protective layer".

Similarly, mention may be made of European Application EP 114 762 published on Aug. 1, 1984 in the name of the firm SUPPORT SYSTEMS INTERNATIONAL for a "Mattress for therapeutic use, particularly for avoiding the formation of bedsores for a long-term bedridden patient" and which specifically relates to a mattress of waffle-iron type, but of which the foam which constitutes it is constituted by three superposed layers of cellular material having a crush strength increasing from the contact surface of the projections to the sole; and Appln. EP 135 771 published on Apr. 3, 1985 in the name of BAYER AG for a "Cushion whose interior is made of foam and with an air-permeable cover", and which describes a process for manufacturing from a coating material sealed tightly on the foam in which the latter is injected, then a part of the seal is destroyed to render it air-permeable.

All these publications and others therefore describe various possibilities of producing and obtaining either characteristics as set by certain standards such as the French standards mentioned above, or improvements to cushions or mattresses, both in their form and in their composition or protection, but none teaches nor suggests a complete process of manufacture allowing said manufacture to be automatized, at least for obtaining cushions or mattresses by pre-moulding the desired form, which is one of the objects of the present invention. However, such automatization would enable products uniform in their quality to be obtained more reliably, all the more so as foam expanded with chlorofluorocarbide (CFC) type propellant gas are no longer to be used, but water foams which are much more delicate to employ and do not allow variation in the operational conditions; on the other hand, automatization allows a high production capacity in a small space and with minimum manpower.

Thus, the casting or injection of the foam in a mould is often effected manually at the present time, which takes time and does not allow a uniform distribution of the components for producing the foam in the mould, then creating variations in density of the material during expansion thereof once the mould is closed and in the case of water foam, does not allow a good expansion thereof.

Processes and devices proposing a certain automatization are indeed known, such as the one described in U.S. Pat. No. 4,532,093 to Mr. O'MALLEY, for the manufacture of foam-moulded packings, with the aid of an injection head displaced by an automatic mechanical means above a mould to ensure a certain distribution of the foam therein, but the path of the head is very limited and therefore does not allow a real controlled distribution in the whole mould; demoulding is effected thanks to a cover which is placed by hand prior to injection, then removed, which is not practical and slows down operations; the circular carrousel used comprises only two moulding stations and locations; and, furthermore, nothing is specified nor described nor evoked for specifically treating the problems, on the one hand, of moulding objects such as cushions or mattresses composed of adjacent projections such as in the form of frustums of pyramids fast with one common sole and, on the other hand, of the very delicate use of water foams.

In fact, polyurethane foams need a propellant gas to constitute their open cells and, up to the present time, the gases used to that end were alkanes or halogenated, essentially fluorinated hydrocarbons, of which one of the best known is the one bearing the registered Trademark "FREON" of DU PONT DE NEMOURS, and chlorofluorocarbides, called CFCs: however, such gases are at the present time considered noxious and are being progressively prohibited.

A known solution for making open-cell foam is to replace this propellant gas by water which is previously mixed in one of the basic components, for example as described hereinafter, polyol, and which, during the chemical reaction with the other component, which is preferably isocyanate for example, produces an exothermic effect greater than 80° C.; the water is then evaporated and, by secondary chemical reaction, creates carbon dioxide, forming by the gas thus produced the open cells of the foam.

However, such a reaction is slower than with the CFC gases, which requires a longer waiting time for demoulding, during which the expansion pressure produced may be 450 g/cm², or equivalent to that of expansion of foam with CFC but, depending on the formulations, can go up to 650 to 750 g/cm², viz. double that produced with the CFC gases; the temperature of the mould must also be higher than 15° C. minimum with respect to that necessary with these latter gases, and, on the one hand, cannot be maintained by the sole exothermic reaction of the product itself, on the other hand, must be maintained in a very strict range of 58°to 62° C. and preferably 60° C., on which the quality of the expansion, and therefore of the terminated foam, depend; furthermore, as indicated hereinbefore, the distribution of the product in the mould must be very precise and follow a strictly defined path, which must always be the same, otherwise there are variations in consistency of the foam and heterogeneous cells, both at the level of their diameter and their distribution, which would render the mattresses or cushions thus produced, unusable.

Furthermore, in order to facilitate cleaning and to preserve the mattresses from stains, an external water-proof protection system is often added, which may be a waterproof cover which, inter alia, may hinder deformation of the projections and therefore their efficacy of distributing pressure, and be the cause of noise and friction, and in any case does not completely prevent the foam from being stained; it has been envisaged to add, after manufacture, a waterproof protective film adhering thereto:

either by immersion of the mattress or cushion elements in baths such as natural rubber but requiring handlings, manipulations and thickness checks, which increases the cost of the finished product;

or by projection of paint, but, in that case, it is on the one hand impossible to protect the hollow parts which are most exposed to tear and of difficult access for cleaning, and, on the other hand, by manual methods, the projected layer cannot be uniform, which, in the event of excess thickness, modifies the desired surface suppleness, and, if the thickness is too little, does not give sufficient protection, and in any case creates zones of different, therefore unaesthetic, colours.

The objects of the present invention are therefore to develop a process, and a device for carrying it out, for manufacturing such cushion and mattress elements of supple cellular material, such as polyurethane foam, preferably expanded with water and pre-moulded to the desired form, essentially making it possible:

to automatize this manufacture in complete safety, respecting the regulations concerning the components for making said foam;

to obtain characteristics of said foam which are, on the one hand, in accordance with the standards and, on the other hand, optimum for maximum comfort and of constant and repetitive quality;

to ensure a high manufacturing rate, with a minimum of moulds;

to project a water-proof paint, ensuring a minimum effective protection of the cushion or mattress elements, without disturbing the characteristics of comfort thereof, nor the homogeneity of their colours.

SUMMARY OF THE INVENTION

These objects are attained with a device for manufacturing elements of cushions and mattresses made in known manner of supple, open-cell cellular material, by casting in a mould, from a head ensuring mixture of at least two basic components, the product thus formed and which, by reaction of its components, expands, and, filling the whole volume of said mould, constitutes said cellular material; according to the invention:

at least five moulds are located on a circular carrousel, distributed uniformly at 1/5th of the circumference of said carrousel for each and comprising a plurality of hollow recesses opening out in their upper part in a common volume constituting a continuous sole for said cushions and mattresses;

said moulds are automatically transferred, successively and horizontally by said carrousel from a preparation station where a demoulding agent is projected over the whole of their surface, to beneath said head;

said head is displaced by any mechanical means above each mould in a continuous path covering at least all the recesses thereof at a speed which varies depending on the parts of the path and ensuring, on the one hand, for a given flowrate of casting of the product, a desired distribution thereof in each recess, and, on the other hand, a total time of passage over the path less than the maximum time of expansion of the product projected at the beginning of this path;

a cover is closed on each of the moulds, after the end of passage of the head over the path and it is held by any means compensating the effort of the internal expansion pressure of the foam; at the same time, a controlled communication of the internal volume with the outside may be ensured via some vents so that the air can escape without risk of the foam collapsing; the mould thus closed is then transferred automatically by said carrousel towards successive standby stations where it remains for a time at least equal to or preferably greater than that of maturing of the cellular matter obtained and during which the temperature of the mould is maintained in a given range;

said cover is opened, the cushion or mattress element thus constituted is removed and the cleanliness of the mould is checked; the above operations are then recommenced to produce another element from the preparation station which may be the same as the one where the terminated elements are removed or another, distinct station located just afterwards.

In order to obtain the characteristic of waterproofing, after the station where the demoulding agent is projected, and before the transfer of the mould beneath the casting head, this mould is displaced automatically by said carrousel towards a station where a water-proof paint is projected uniformly over the whole of its surface, on which paint the supple cellular matter obtained by expansion of the product, may adhere.

At this station for projecting water-proofed paint and in a preferred embodiment, the device according to the invention comprises a spray pipe parallel and of length equal at least to one of the sides of the mould, comprising nozzles distributed over the whole of its length and displaced regularly and uniformly perpendicularly to said side.

In order to render the different phases of the above process automatic:

the mould-transfer carrousel and the mechanical equipment performing the different operations of displacement of any mobile device, and of casting, recycling, storing the components and any product to be projected, are equipped with physical measurement and position sensors, which are connected to at least one automat for controlling the various equipment concerned;

said automat is automatically and continuously programmed to perform the manufacturing operations concerning at least the displacement and transfer of the mould between each work station, respecting the minimum times imposed between each station, and casting of the product, respecting the maximum time imposed.

This results in novel processes and devices for manufacturing cushion or mattress elements in supple cellular matter, satisfying the objects defined hereinabove and bringing a certain number of advantages over the heretofore known techniques.

In particular, automatization of the displacement and handling of the casting head above the mould makes it possible, by controlling its passage and varying the speed of this head, to distribute the product over the whole surface of the mould and depositing in each recess the quantity exactly necessary, even if the recesses are of different dimensions, especially on the periphery of the cushion or mattress element, in order to have for example a homogeneous density everywhere or, on the contrary, a variable but controlled one: this is very important for such mould shapes in the form of upturned waffle-iron which comprise many receptacles isolated from one another, and it is therefore impossible to control visually and manually due to the reaction and fairly rapid rise of said foam as it is cast, which does not usually make it possible to know the quantity which was poured; moreover, it is necessary to be able to terminate complete passage of the path covering the whole surface of the mould in a much reduced time, for example less than 20 seconds for nearly 7 meters of path, as the foam arrives at the upper level of the mould, or at the level of the sole of the element which is in fact positioned upside down in the mould, and which has a height of 17 cm as set by French standards, in about twelve seconds, with a foam with CFC propellant gas and about 25 seconds with water foam, and there must be time to be able to close the cover before this duration expires, or in fact when the foam attains only the edge of the recesses. Now, as a casting head may represent a weight of the order of 40 kg, such a manoeuvre with speeds of 0.70 meter per second and multiple changes of direction, is possible to carry out under good conditions only with a good mastery and knowledge of the path and precisely a complete automatization.

Mastery and exact knowledge of the path over which said head passes, of the speed thereof and of the flowrate of the product injected, make it possible perfectly to master the density of the foam obtained, as a function of the volume of the recesses and of the mould, which is preferably chosen within the maximum range authorized, viz. between 40 and 42 kg/m$^3$ optimally to have both a good foundation and a good deformation of the foam: the process according to the invention makes it possible to obtain such a density with less than 0.5% of variation for each cushion or mattress element produced, Furthermore, in the present invention, said casting head may preferably be supplied with basic components via at least two independent circuits in which said components are recycled in a continuous loop from storage reservoirs when casting of the product is stopped; the pressure, temperature and exact flowrate of each component may thus be controlled very precisely in order to obtain optimum dosage and mixture, especially with the compositions used preferably in the present invention, such as: a mixture of 100 particles of a preparation based on polyol, whose viscosity is of the order of 1300 mPa.s, with 36 particles minimum and 50 at best of a basic preparation of diisocyanate, whose viscosity is only of the order of 7 mPa.s.

The choice of such a mixture, thanks to the process of the present invention, is all the more interesting as it makes it possible to use a mixture with expansion in water, found in the polyol preparation, and therefore not using, as in the majority of foams at the present time, chlorofluorocarbide (CFC) which is being increasingly eliminated and condemned. However, the considerable difference in viscosity between these two components makes it difficult to obtain a good mixture; to that end, use is then made: either of low-pressure supplies of the injection head in that case provided with a comb-type stirring rotor, rotating in a chamber in which the components are introduced, or two high-pressure supplies, one for each component, opening in a mixing chamber of the head at 160 bars minimum and preferably 180 bars, and disposed face to face at 180° with respect to each other, in that case ensuring mixture by the products striking each other; this second solution allows on the one hand a better quality of the mixture despite the differences in viscosity and, on the other hand, simplified cleaning by a simple scraper piston which is displaced in the mixing chamber after every injection and at regular intervals between two injections, while, with a low-pressure head equipped with a comb, it must be cleaned with an additional product, which complicates use thereof.

Concerning the water-proof paint, a monocomponent polyurethane paint in aqueous solution may also be used in the process according to the invention, the evaporation of which paint is fairly rapid and which requires a minimum drying, of the order of 60 seconds.

Projection of paint in the bottom of the mould before the foam is cast makes it possible:

on the one hand, to deposit a controllable, regular film over the whole bottom of this mould, thanks in particular to a device described previously, such as a spray pipe parallel to and of the same length as one of the sides of a mould;

and, on the other hand, to project more paint at the level of those parts of the mould corresponding to the hollows of the mattress or cushion elements, which are therefore projecting, and which receive a slightly too full coat at that spot, where the projections then formed are precisely the most stressed; the paint thus participates in the tear strength thereof, even if its thickness is only some microns, which is not possible to obtain with a paint projected afterwards.

The possibility of using a paint in aqueous solution allows a diffusion at low pressure less than 4 bars, therefore without fog, and Limiting losses by diffusion of the paint, nor crushing and powdering effect, nor return of the product by rebound against the mould, which limits all the more loss of the product and ensures a perfect regularity of projection, uniform over the whole surface.

The minimum choice according to the invention of five mould locations disposed regularly in a ring on a circular carrousel, makes it possible, with a stop time after every step of rotation of a fifth of a revolution corresponding to the presentation of each mould successively at each work station, of 60 seconds minimum and in fact 120 seconds in the case of water foam, including the transfer time between each step of rotation, to respect the different standby times necessary between each of these work stations corresponding to certain phases of the process, namely:

after the casting phase which therefore takes between 12 and 25 seconds for example, depending on the foam used, as indicated hereinbefore, and closure of the cover of the mould, then to wait, as the other following two sectors of rotation do not correspond to any work station, of the order of three times 120 seconds less the injection time at the first station of 20 to 30 second, viz. 330 to 340 seconds therefore, which is the precise minimum time necessary for obtaining maturing of the water foam, namely its cross-linking and foaming in the whole volume, then drying until it does not stick; this is therefore effected in three positions of the carrousel, before opening the cover and presenting the mould in its fourth angular position or sector of rotation with respect to that of casting;

after opening of the cover, the manufactured element may then be removed, the quality thereof checked as well as the cleanliness of the mould, during less than half the 120 seconds corresponding to the duration of presence of the mould at this work station; during the remaining time, the demoulding agent may then pass at this same station, which takes only a few seconds and which requires drying of the order of a little more than one minute, therefore in total in accordance with the duration of maintaining the mould corresponding to this station; this demoulding agent may pass at low pressure, of the order of 450 mb, the effect of which is to have a diffusion without ground effect, which thus allows 85% of the product to be deposited in the mould with a minimum fog;

the fifth sector of rotation of the carrousel then corresponds to the position of the station where the waterproof paint is projected when this is desired, knowing that such projection likewise takes only some seconds, but requires drying likewise of the order of a little more than a minute.

Thanks to the arrangement of the carrousel in five sectors minimum corresponding to five mould locations and five standby or work stations as defined hereinabove, an optimum manufacturing output is thus obtained, with a period of 120 seconds per step of rotation for water foam, a possible production of 30 elements per hour, using a minimum of mould locations and therefore with optimum dimensions of the carrousel.

If foam with CFC gas for example is used, whose maturing time is shorter, viz. from 3 to 4 minutes or 180 to 240 seconds, rotation may be accelerated with only 105 to 110 seconds stop, for example, per station, which is compatible with the characteristics of the other operations defined herein above and would then enable from 32 to 35 elements to be produced per hour. This same production rate may also be obtained for water foam with a carrousel with six mould locations instead of five, the additional one corresponding to a third station or sector of rotation awaiting maturity of the foam between the injection station and the demoulding station; there is then a total waiting time of four times 105 or 110 seconds, less that of injection, viz. 390 to 410 seconds, which is sufficient and even more reliable than that of 330 or 340 seconds with five locations and a step of 120 seconds.

If it is desired to accelerate the production with water foams further in and according to other embodiments, a carrousel with eight or nine mould locations for example is used, if there is no operation of projection of water-proof paint: in that case, there are five or six standby positions or sectors, without work station, instead of two for the carrousel with five mould locations or three for that with six locations, then making it possible, with only 60 seconds stop per sector, to ensure the 330/340 standby seconds minimum, or preferably 390 to 410 seconds, necessary for the maturing of the foam between the injection station and the demoulding station; there still remains a position between this station for demoulding and evacuating the element manufactured and the station for injection of the following, making it possible, at best and after preparation by projection of the demoulding agent at the demoulding station, only to ensure its drying, which is of the order of a minute.

If an operation of projection of water-proof paint is to be carried out, a carrousel with ten to twelve mould locations is then preferably provided, in order to have available, in addition to the standby stations and sectors defined for a carrousel with eight or nine locations, on the one hand, the station necessary for projecting this paint and, on the other hand, waiting time for drying thereof, viz. therefore at least one other position or sector. Production may then be doubled, theoretically up to sixty to sixty eight elements made of water foam, per hour.

Other advantages Of the present invention might be mentioned, but those set forth hereinbefore already sufficiently demonstrate the novelty and interest thereof.

Tests have demonstrated the feasability of the characteristics described herein above and hereinafter, and which were the subject of prior research to find the optimum, innovating solutions for the objects defined, while no known device nor process provided such solutions; up to the present time, no one was able to implement all the characteristics as combined in the present invention, as, precisely, these characteristics require specific solutions which were not obvious.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
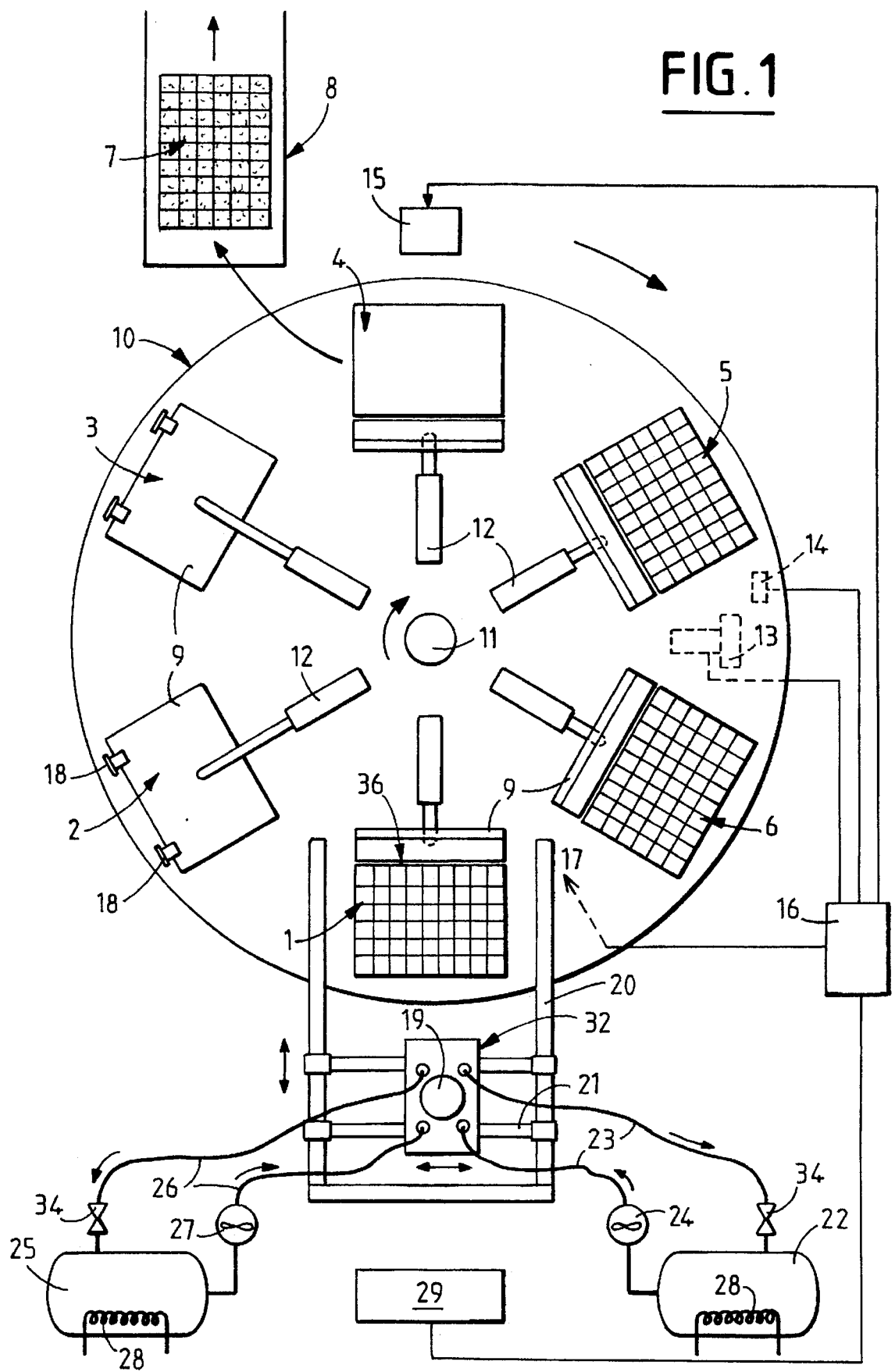
FIG. 1 is an overall plan view of a device according to the invention for carrying out the process of the invention, with six mould locations on the carrousel.
Figure 2:
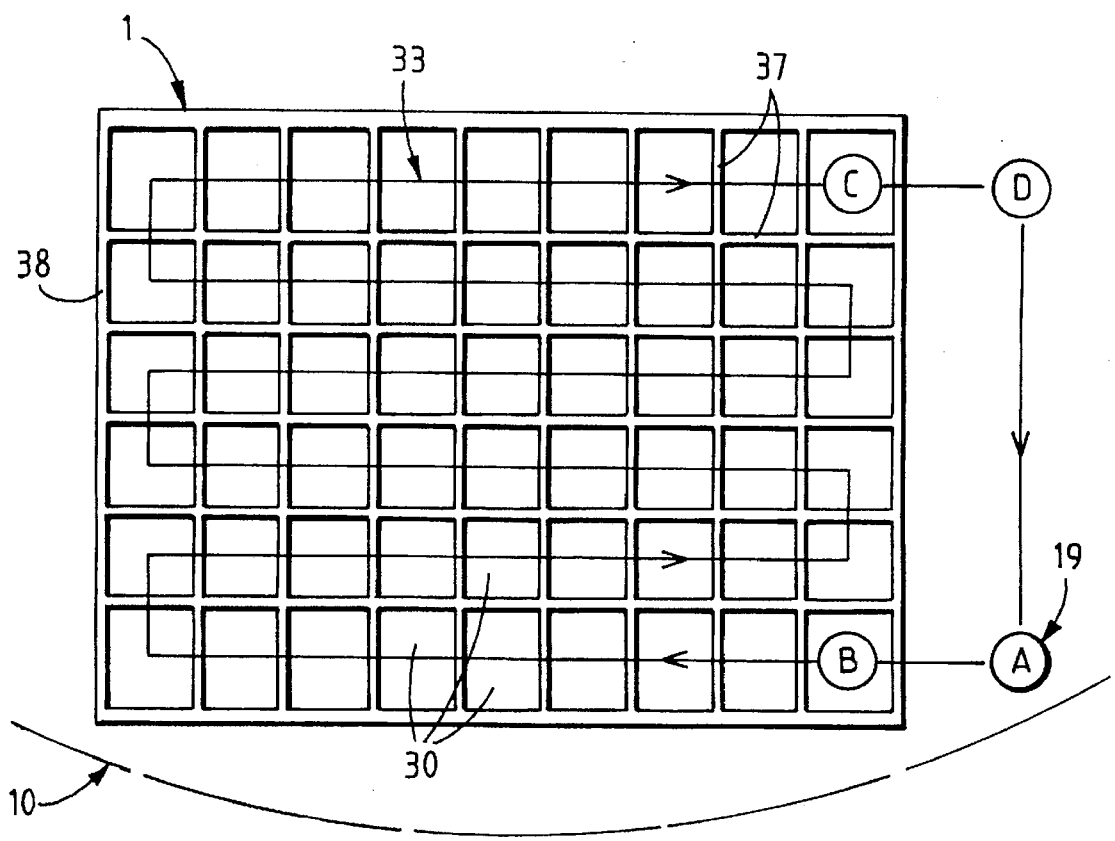
FIG. 2 is a detailed plan view of a mould in the form of a waffle-iron in position for casting the foaming product.
Figure 3:
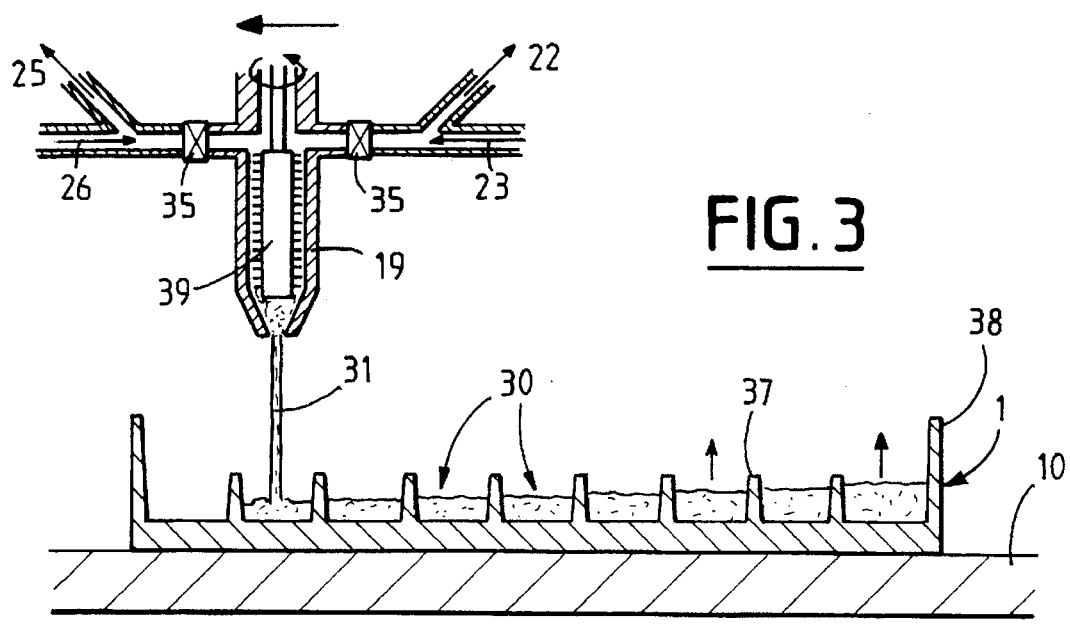
FIG. 3 is a view in longitudinal section of the mould of FIG. 2 in the plane of the casting head.

Referring now to the drawings, cushion or mattress elements 7, as may be produced by the device of the invention as shown in FIG. 1 and in accordance with the process of the invention, are described in the preamble and are known at present as being made of supple, open-cell cellular matter: this matter is therefore obtained by casting a mixture of at least two basic components in a mould 1 which comprises a plurality of recesses 30 and gives the shape of these elements 7 as shown in FIGS. 2 and 3; the most commonly used shape is of waffle-iron form comprising a continuous sole from which emerge projections in the form of frustums of pyramid, distributed uniformly over the whole desired bearing surface and shown here upside down during casting into mould 1 in FIG. 3, namely the frustums of pyramid converging and being oriented with the apices downward, and laterally defined by partitions 37 of the mould i and the sole being formed last, above the partitions 37, and between the peripheral walls 38 of the mould 1.

The device for manufacturing the elements 7 proper comprises, in known manner, a head 19 for mixing and casting the product 31 thus formed by mixing the two basic components and which, by reaction of these components, expands in each recess 30 as it is cast; then above, and fills the whole volume of said mould 1, constituting said cellular matter.

According to the invention, the device further comprises:

a preparation station 5 where a demoulding agent is projected over the whole surface of the mould 1, as described hereinabove;

another work station 6, although this station is not always necessary and, in certain types of embodiment, it is not necessarily used; at this work station 6, located between preparation station 5 for projecting the demoulding agent, and station 36 for casting the product 31, there is uniformly projected over the whole surface of the mould 1 which is transferred thereto, a water-proof paint on which the supple cellular matter obtained by expansion of product 31, may adhere;

a circular carrousel 10 for transferring said mould 1 at least between the preparation station 5 and the station 36 located beneath said head 19 for casting the product 31, then between this product-casting station 36 and a station, 4 or 5, where the cushion or mattress element 7 thus produced may be removed from the mould 1; this demoulding station may in fact also be the preparation station 5, making available an additional location for awaiting maturity of foam, like preceding ones 2, 3; once this mould is freed of element 7, it is available for effecting a new cycle of manufacture and the carrousel moves it between this station 4 or 5 for projecting demoulding agent, and the station 36 for casting the product 31 possibly with the work station 6 for projecting waterproof paint.

Said carrousel 10 for transferring moulds between the various work stations 4, 5, 6, 36 is horizontal, rotates about a vertical, central pin 11 and comprises, to allow continuity in the manufacture of the moulds and therefore a better production rate, sir mould locations, corresponding, on the one hand, to the three minimum stations 5, 36 and 4 defined hereinabove, and three other locations of which at least two, 2 and 3, are not associated with a work station and are located between station 36 for casting the product 31 and station 4 for removing the cushion or mattress element 7. These stations 2 and 3 are in fact standby positions defined hereinbefore during which the product expands and occupies the total volume inside the mould 1. The third location 6 available may either also be a standby location for drying the demoulding agent, or associated with a station where waterproof paint is projected.

Each of these locations of the carrousel 10 is equipped with a mould 1 and a cover 9, and these locations are disposed regularly in a ring so that the moulds occupy at the same time all the stations considered hereinbefore, then one after the other upon every step of rotation of said carrousel 10, in order to follow the process of manufacture of the elements 7, as described hereinabove.

Each mould is closed by a cover 9 articulated about a pin located along one side of this mould 1, and maneuvered for example by at least one jack 12 located towards the centre of the carrousel; these means 12 for maneuverins the covers 9 which close the different moulds 1 may be associated with other means 18 or closure bars also maneuvred by jack and bearing locking and blocking that side of the covers opposite their articulation, in order to contain the pressure of the product which expands inside the moulds, especially when it is question of water foam of which the pressure values have been given hereinbefore.

Covers 9 are therefore maintained fixed for a time at least equal to or preferably greater than that of maturity of the cellular matter obtained, which therefore corresponds to the waiting time at stations 2 and 3, then they are re-opened when the corresponding mould arrives at the removal station 4, from which the finished cushion or mattress element 7 is removed and placed for example on an evacuation system 8, of the conveyor belt type, towards storage.

At the level of station 35 for casting the product 31; the device according to the invention comprises a mechanical means 20, 21 for displacing said casting head 19 above the mould 1, which is located therebeneath, in a continuous path 33, as represented in FIG. 2, covering at least all the surface thereof and at a speed which in fact varies depending on the parts of the path to ensure, on the one hand, a desired distribution of the product 31 with a determined flowrate of casting for the quantity of product 31 deposited in each recess 30 to correspond, once the product has expanded, to the volume of the projection and to the desired density of foam and the associated sole part, and, on the other hand, a total time of passage over the path 33 less than the maximum expansion time of the product projected at the beginning of this path.

In one embodiment and as shown in FIG. 1, said mechanical means 20, 21 for displacing the casting head 19 are constituted by two perpendicular assemblies of at least two parallel rails; one assembly is fixed and covers the means 10 for transferring the mould 1 on either side of the position 36 thereof, and the other assembly, motorized with respect to the first, moves therealong and itself bears said head 19, which may be held by a support 32 and which, likewise motorized, moves longitudinally with respect to this second assembly. The two mechanical displacement assemblies may be replaced by a robot arm.

If a constant density of the foam in the whole cushion element is desired, the speed of displacement of the head 19 will be calculated so that the distribution of the product in the recesses 30 is uniform and if, on the contrary, density variations are desired, for example denser on the periphery in order to have a different lift, and if injection is effected at constant flowrate and pressure, the speed of displacement of the head above the recesses 30 concerned will be decelerated in order to deposit more product without having to modify the supply rate of the basic components in the head; the inverse may, of course, be done.

On the contrary, a second head is provided if, at different parts of the cushion, different foam hardnesses and not simply variations in density are desired, therefore with differences in the composition of the mixture. If it is desired to add other products in the composition of the mixture, such as a dye and/or melamine to have a better fire resistance, one or more corresponding supply orifices are added, disposed perpendicularly to the plane of FIG. 3 and to the other two orifices of the circuits 23 and 26 supplying the basic components, and which open out in the same horizontal plane as the latter so that they strike one another and are mixed.

According to the invention, the device further comprises at least two independent circuits 23, 26 in which said components necessary for constituting the cellular matter, such as polyol and diisocyanate, are recycled in continuous loops between said casting head 19 and the storage reservoirs 22, 25, when casting of the product 31 is stopped thanks to obturators 35 located on said casting head 19, as shown in FIG. 3. Inversely, when it is desired to cast said product 31 through the casting head 19 thanks to the mixture ensured for example either in the case of low-pressure supply by a comb-type rotor 39 therein, or by a direct high-pressure supply of the components coming from circuits 23, 26, the return circuits are obturated by obturators 34 located towards the storage reservoirs 22, 25, respectively.

Circulation of each of the components from said storage reservoirs in all the circuits, either in a close loop or in order to be cast in the mould 1 through the casting head 19, is ensured by pumps 24 which may be called recirculation, injection or casting pumps; these pumps 24 thus supply the circuits 23 and 26, each with a given component, at the desired pressure and depending on the desired flowrate in order, on the one hand, to ensure a total flowrate of the head 19 with product 31 as defined hereinbefore and, on the other hand, a given proportion of each component in the product 31: these operational characteristics are controlled by a control automat 29 which also pilots the movement of the head 19 thanks to the motors driving the displacement rail 21 and the latter.

In said storage reservoirs 22 and 25, heating systems 28 enable the components to be maintained at the temperature desired for each, and which is also controlled by said control automat 29, depending on a determined programmation, as a function of the components used for the desired product, which makes it possible to obtain under optimum conditions the desired characteristics of the final product; the product, after having been cast in the recesses 30, as shown in FIG. 3, in sectional view according to FIG. 2 of a complete mould 1, expands progressively from the beginning of casting up to the end of casting, and after closure of the cover 9, as described hereinbefore.

In addition to this automat 29 for controlling the head 19 and all the equipment associated therewith, the device according to the invention may comprise different physical measurement and positioning sensors associated with the mechanical equipment ensuring the different mould transfers and displacements of all the mobile elements of the device, around and on the carrousel 10, such as:

the system 13 for driving the latter, for example by a friction wheel system placed therebeneath, a sensor 14 detecting the position of said carrousel with a system for blocking it when each of the moulds 1 in rotation has attained the work position of the following station, different sensors 17 for monitoring the different manoeuvring means 12 and for checking the position of the covers 9, sensors detecting the temperature of the moulds 1 to pilot a system (not shown) of continuous reheating from circulating pumps and at least one liquid reservoir maintained at a given temperature and preferably of low inertia in order to be able better to regulate the temperatures of the moulds which must be maintained within a range of 58° to 62° C. necessary for correct expansion of the water foams, thanks to exchangers located in the covers and soles of the moulds 1.

All these sensors and monitoring devices may be connected to an automat 16 which both monitors and controls, depending on a predetermined programmation, to ensure the presentation of each mould 1 successively at each work or standby station, at a rate and for a given time; the two automats 16 and 29 as defined previously are preferably connected to work in coordination without outside intervention, and may even be constituted by one centralizer automat.

Only one operator is needed near station 4 where he can evacuate the finished cushion elements onto an evacuation system 8. This operation may equally well be automatic, but an operator is preferable in order to check the state of the cushion or mattress elements 7 at the end of manufacture; moreover, he may have a safety pedal 15 which he maintains depressed as long as he is at his station and which, if he leaves this station, blocks the whole of the device and places certain equipment on standby, this constituting a safety guarantee.

What is claimed is:

1. A device for manufacturing cushion and mattress elements made of supple, open-cell cellular matter obtained by casting a mixture of at least two basic components in a mould, the device comprising:

a head and a mechanical means for displacing said head above said mould and ensuring said mixture and said casting of the product thus formed, which, by reaction of its components, expands and fills the whole volume of said mould for constituting said cellular matter, and a means for transferring said mould between a preparation station and a casting station located beneath said head, and means for maneuvering a cover to close it on the mould, maintain it fixed for a time greater than that of maturing of the cellular matter obtained, and then for re-opening it, said device further comprising:

a circular mould-transfer carrousel rotatable about a vertical central pin and comprising at least five mould locations for a plurality of moulds, said moulds comprising a plurality of hollow recesses opening out in their upper part in a common volume constituting a continuous sole of said cushions and mattresses, said carrousel ensuring displacement of said moulds between at least the product casting station, a station where the cushion and mattress element produced is removed from the mould and a preparation station where a demoulding agent is projected over the whole surface of the mould, said moulds are disposed regularly in a ring to occupy at the same time at least all the stations, then one after the other, upon each step of rotation of the carrousel;

said mechanical means capable of displacing said head along a continuous path covering at least all the recesses of the mould and at a speed ensuring, on the one hand, for a given flowrate of casting of the product, a desired distribution thereof, and, on the other hand, a total time of passage over the path less than the maximum expansion time of the product projected at the beginning of said path, said device further comprising:

property and positioning sensors associated with the mould-transfer carrousel and mechanical means for sensing a physical property and position of at least one of the mould-transfer carrousel and mechanical means, and at least one automat means responsive to the physical property and positioning sensors for controlling at least one of the mould-transfer carrousel and mechanical means.

2. The device for manufacturing cushion and mattress elements of claim 1, wherein it further comprises a work station between the preparation station for projecting the demoulding agent and the one for casting the product, and where at said work station, there is uniformly projected over the whole surface of the mould which is transferred, a water-proof paint on which the cellular matter obtained by expansion of the product may adhere.

3. The device for manufacturing elements of claim 1, wherein said mechanical means for displacing the casting head is constituted by two perpendicular assemblies of at least two parallel rails, of which one assembly is fixed and overlaps the mould transfer means on either side of the position thereof, and the other assembly, motorized with respect to the first, moves therealong and itself bears said head, likewise motorized and moving longitudinally with respect to this second assembly.

4. The device of claim 1, wherein it comprises two independent circuits, in which said components are recycled in a continuous loop between said casting head and storage reservoirs when casting of the product is stopped by obturators located on said casting head.

5. The device of claim 1, wherein it comprises a system for continuously reheating the moulds, from circulating pumps and at least one reservoir of liquid maintained at a given temperature and of low inertia, supplying exchangers located in the covers and soles of the moulds which are maintained at a temperature lying between 58° and 62° C.

* * * * *